United States Patent [19]
Holloway

[11] 3,797,581
[45] Mar. 19, 1974

[54] GARDENER'S HELPERS CUTTING HOE

[76] Inventor: Robert E. Holloway, c/o George Specter, 3615 Woolworth Building, 233 Broadway, New York, N.Y. 10007

[22] Filed: Apr. 14, 1972

[21] Appl. No.: 244,074

[52] U.S. Cl. ............................. 172/372, 172/375
[51] Int. Cl. ..................................... A01b 1/00
[58] Field of Search ..................... 172/371–381

[56] References Cited
UNITED STATES PATENTS

| 2,852,996 | 9/1958 | Meyer | 172/378 |
| 3,293,674 | 12/1966 | Sapia | 172/371 X |
| 2,201,436 | 5/1940 | Jones | 172/375 |
| 2,903,079 | 9/1959 | Dyer | 172/372 |
| 2,243,127 | 5/1941 | Roseman | 172/375 X |
| 1,339,222 | 5/1920 | Randall | 172/375 X |
| 492,364 | 2/1893 | Powers | 172/372 |

Primary Examiner—Robert E. Pulfrey
Assistant Examiner—R. T. Rader

[57] ABSTRACT

An agricultural hand implement for hoeing a ground, the device incorporating a flat blade attached at right angle to a socket receivable on the end of an elongated handle and the blade leading edge being toothed so to effectively cut down weeds.

1 Claim, 3 Drawing Figures

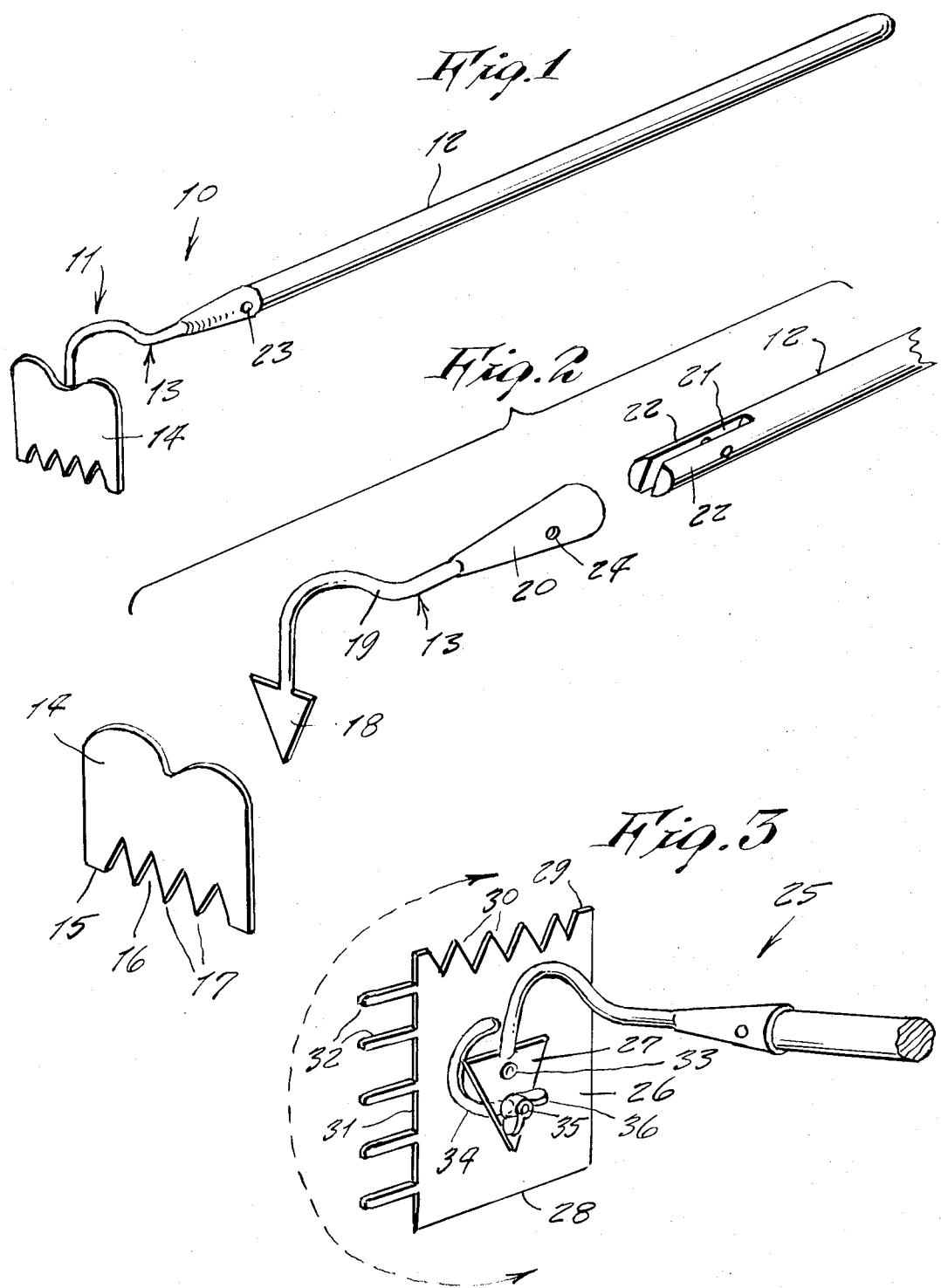

GARDENER'S HELPERS CUTTING HOE

This invention relates generally to agricultural implements.

A principle object of the present invention is to provide a hoe that incorporates means for cutting down weeds.

Another object is to provide a hoe that is designed for use by farmers, gardeners, and by women.

Another object is to provide a hoe which incorporates a means to alter the hoe cutting edge for specific different jobs to be performed.

Other objects are to provide a gardener's helper's cutting hoe which is simple in design, inexpensive to manufacture, rugged in construction, easy to use, and efficient in operation.

These and other objects will be readily evident upon a study of the following specification and the accompanying drawing wherein:

FIG. 1 is a perspective view of the invention.

FIG. 2 is an exploded view of the parts thereof.

FIG. 3 is a fragmentary view of a modified design of the invention.

Referring now to the drawing in detail, and more particularly to FIGS. 1 and 2 thereof at this time, the reference numeral 10 represents a gardener helper's cutting hoe according to the present invention wherein there is a working head 11 at one end of an elongated, straight wooden handle 12. The working head is comprised of an intermediate member 13 securable at one end to the handle end and which at its opposite end is secured to a blade 14.

The blade 14 comprises a flat rectangular, metal plate having a lower cutting edge 15; the edge 15 being provided with a series of V-shaped notches 16 so to form pointed teeth 17 therebetween.

The intermediate member 13 comprises a forging of metal having a triangular flat pad 18 at one end thereof for being welded to a rear side of the blade 14, the pad being connected by a bent rod portion 19 to a socket 20 at the opposite end and into which the handle end is secured and receivable.

The handle end has a longitudinal central slot 21 for springingly fitting the resultant tongues 22 into the socket, after which a rivet 23 fitted through an opening 24 of the socket secures the handle in place.

Thus in operative use there is a hoe particularly designed to cut down weeds.

The blade is five inches wide; the handle is fifty two inches long; the blade being at right angle plane to the handle axis.

In FIG. 3 a modified design of the invention incorporates a hoe 25 in which the flat blade 26 is pivotable about the pad 27 so that a different side blade edge can be selectively positioned for operational use.

The blade 26 has a plain, straight cutting or hoeing edge 28 along one peripheral edge, a toothed edge 29 with V-shaped teeth 30 as above described along another side edge, and a rake edge 31 formed with long tines 32 along another side edge. The blade is pivotable about a rivet 33 attached to the pad 27. An arcuate slot 34 in the blade received a bolt 35 fitted through an opening in the pad. A wing nut 36 is fitted on the bolt. The bolt serves to secure the blade in any desired position for operational use.

While various changes may be made in the detail construction it is understood that such changes will be within the spirit and scope of the present invention as is defined by the appended claims.

I claim:

1. A gardening device comprising an elongated handle removably mounted on a gardening implement, where said implement includes a conical socket at one end adapted to receive the handle axially therein, said handle having spaced tongues biased apart resiliently and which are forced together by the socket when said tongues are mounted in said socket, including a removable fastener mounted transversely through said tongues and socket securing the tongues in said socket, said implement further including a pad connected to the socket with a gooseneck portion, said pad being disposed at right angles to the axis of the handle in combination with a rectangular gardening tool adjustably mounted in parallel abuttment with the pad wherein the pad and tool have coincident central axis parallel to and spaced from said handle axis, said pad being triangular and smaller in perimeter than the tool whereby said tool projects beyond the pad perimeter at all points, said tool having edges at right angles to each other each said edges having different configurations for various gardening operations, said pad being pivotally secured by a central rivet at one point and adjustably secured at another point spaced from the rivet whereby the pad can be rotated about the rivet to cause the pad to assume angular positions relative to the tool, whereby planes passing through the handle in each of said positions will be at right angles to said edges.

* * * * *